US008301100B2

(12) United States Patent
Shiotsuki et al.

(10) Patent No.: US 8,301,100 B2
(45) Date of Patent: Oct. 30, 2012

(54) DIRECTIONAL PATTERN DETERMINING METHOD CAPABLE OF QUICKLY SELECTING OPTIMUM DIRECTIONAL PATTERN

(75) Inventors: Akihiko Shiotsuki, Osaka (JP); Sotaro Shinkai, Osaka (JP); Masahiko Nagoshi, Osaka (JP); Nobuhiko Arashin, Osaka (JP); Hiroyuki Yurugi, Osaka (JP); Wataru Noguchi, Hyogo (JP); Toyoshi Yamada, Osaka (JP); Osamu Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/057,230

(22) PCT Filed: Apr. 22, 2010

(86) PCT No.: PCT/JP2010/002908

§ 371 (c)(1),
(2), (4) Date: Feb. 2, 2011

(87) PCT Pub. No.: WO2010/122796

PCT Pub. Date: Oct. 28, 2010

(65) Prior Publication Data

US 2011/0143698 A1 Jun. 16, 2011

(30) Foreign Application Priority Data

Apr. 22, 2009 (JP) ................................ 2009-103991

(51) Int. Cl.
*H04B 1/16* (2006.01)

(52) U.S. Cl. ................................ 455/276.1; 455/277.2

(58) Field of Classification Search .................. 469/101, 469/269, 272, 273, 275, 276.1, 277.1, 278.1, 469/296

See application file for complete search history.

(56) References Cited

U.S. PATENT DOCUMENTS

| | | | |
|---|---|---|---|
| 6,408,169 B1 | 6/2002 | Pallonen | |
| 6,574,461 B1 | 6/2003 | Sköld | |
| 6,985,106 B2 | 1/2006 | Kawasaki | |
| 7,221,963 B2 | 5/2007 | Ishihara et al. | |
| 7,729,662 B2 | 6/2010 | Abramov et al. | |
| 8,126,417 B2 * | 2/2012 | Saito | 455/272 |

(Continued)

FOREIGN PATENT DOCUMENTS

JP 8-172423 7/1996

(Continued)

OTHER PUBLICATIONS

International Search Report issued Aug. 3, 2010 in International (PCT) Application No. PCT/JP2010/002908.

(Continued)

*Primary Examiner* — Blane J Jackson
(74) *Attorney, Agent, or Firm* — Wenderoth, Lind & Ponack, L.L.P.

(57) ABSTRACT

A plurality of directional patterns are classified into groups and stored in a directional pattern memory, such that among the plurality of directional patterns, the directional patterns strongly correlated with each other are classified into the same group, while the directional patterns weakly correlated with each other are classified into the different groups. One directional pattern is selected from each group in the directional pattern memory. One directional pattern is determined from the selected directional patterns, in accordance with a communication quality of signals each received when each one of the selected directional patterns is set for steerable antenna element. The determined directional pattern is set for the steerable antenna element.

7 Claims, 17 Drawing Sheets

U.S. PATENT DOCUMENTS

| | | | | |
|---|---|---|---|---|
| 2003/0228857 | A1 | 12/2003 | Maeki | |
| 2005/0219122 | A1 | 10/2005 | Kawasaki | |
| 2005/0250453 | A1 * | 11/2005 | Lastinger et al. | 455/63.4 |
| 2006/0234776 | A1 | 10/2006 | Ishihara et al. | |
| 2007/0021069 | A1 | 1/2007 | Abramov et al. | |
| 2009/0213955 | A1 | 8/2009 | Higuchi et al. | |

FOREIGN PATENT DOCUMENTS

| | | |
|---|---|---|
| JP | 2000-134023 | 5/2000 |
| JP | 2004-15800 | 1/2004 |
| JP | 2005-142866 | 6/2005 |
| JP | 2005-286784 | 10/2005 |
| JP | 2007-28569 | 2/2007 |
| JP | 2007-60045 | 3/2007 |
| WO | 2009/144930 | 12/2009 |

OTHER PUBLICATIONS

International Preliminary Report on Patentability issued Dec. 1, 2011 in International (PCT) Application No. PCT/JP2010/002908.

* cited by examiner

*Fig. 10*

| Pb | Pc | Pd | Pe | Pf | Pg | Ph | COMBINED DIRECTIONAL PATTERN |
|---|---|---|---|---|---|---|---|
| 0 | 0 | 1 | 0 | 0 | 0 | 0 | Pa |
| | 1 | 0 | 0 | 0 | 0 | 0 | Pb |
| | | 0 | 0 | 0 | 0 | 0 | Pc |
| | | | 0 | 0 | 0 | 0 | Pd |
| | | | | 0 | 1 | 0 | Pe |
| | | | | | 0 | 1 | Pf |
| | | | | | | 0 | Pg |

COMBINED DIRECTIONAL PATTERN MEMORY 104m

| | CANDIDATE 1 | CANDIDATE 2 |
|---|---|---|
| GROUP G1 | Pa | Pd |
| GROUP G2 | Pb | Pc |
| GROUP G3 | Pe | Pg |
| GROUP G4 | Pf | Ph |

LOW CORRELATION

HIGH CORRELATION

*Fig. 13* f( RSSI1, RSSI2, RSSI3)

| | → T0 | T0 – T1 | T1 – T2 | T2 – T3 | T3 → |
|---|---|---|---|---|---|
| GROUP G1 | Pa | Pd | Pd | Pd | Pd |
| GROUP G2 | Pc | Pc | Pb | Pb | Pb |
| GROUP G3 | Pg | Pg | Pg | Pe | Pe |
| GROUP G4 | Ph | Ph | Ph | Ph | Pf |

Fig.22

| | | CANDIDATE 1 | | | | CANDIDATE 2 | | | |
|---|---|---|---|---|---|---|---|---|---|
| FUNCTION f [dB] | PHY RATE [Mbps] | Pa | Pb | Pe | Pf | Pd | Pc | Pg | Ph |
| −60∼−50 | 54 | 3 | 0 | 5 | 0 | 3 | 0 | 0 | 2 |
| | 108 | 12 | 0 | 11 | 3 | 12 | 2 | 3 | 16 |
| | 216 | 4 | 5 | 3 | 14 | 4 | 5 | 14 | 2 |
| | 300 | 1 | 15 | 1 | 3 | 1 | 13 | 3 | 0 |
| −70∼−60 | 54 | 0 | 0 | 0 | 0 | 0 | 0 | 0 | 0 |
| | 108 | 8 | 0 | 4 | 1 | 8 | 0 | 2 | 5 |
| | 216 | 10 | 7 | 14 | 17 | 10 | 9 | 16 | 14 |
| | 300 | 2 | 13 | 2 | 2 | 2 | 11 | 2 | 1 |
| −80∼−70 | 54 | 2 | 0 | 4 | 4 | 2 | 0 | 4 | 2 |
| | 108 | 16 | 3 | 16 | 12 | 16 | 3 | 10 | 14 |
| | 216 | 2 | 17 | 0 | 4 | 2 | 15 | 6 | 4 |
| | 300 | 0 | 0 | 0 | 0 | 0 | 2 | 0 | 0 |
| ... | ... | ... | ... | ... | ... | ... | ... | ... | ... |

*Fig.23*

COMBINED DIRECTIONAL PATTERN MEMORY 104m

| | CANDIDATE 1 | CANDIDATE 2 |
|---|---|---|
| GROUP G1 | Pa | Pe |
| GROUP G2 | Pb | Pc |
| GROUP G3 | Pf | Pg |
| GROUP G4 | Pd | Ph |

LOW CORRELATION (vertical arrow)

HIGH CORRELATION (horizontal arrow)

DIRECTIONAL PATTERN DETERMINING METHOD CAPABLE OF QUICKLY SELECTING OPTIMUM DIRECTIONAL PATTERN

TECHNICAL FIELD

The present invention relates to a directional pattern determining method for a wireless communication apparatus. In particular, the present invention relates to a directional pattern determining method of changing a directional pattern of a steerable antenna device in response to variations in a radio wave propagation environment to determine an optimum directional pattern.

BACKGROUND ART

Among network configurations for interconnecting information terminals, network configurations including wireless communication apparatuses are utilized not only for conventional data transmission for personal computers, but also now incorporated into various home electrical products and utilized for audio and visual transmission, because of advantages as compared with wired communication, e.g., high portability and free installation of terminals, and weight reduction by eliminating wire cables. However, while wireless communication apparatuses have the above advantages, since the wireless communication apparatuses establish communication by emitting electromagnetic waves in a space, the transmission characteristics often degrade in a space provided with many reflectors, due to influence of fading of radio waves arriving after reflections by some objects (delayed waves). In order to reduce this influence, there is a method of controlling the directivity of a transmitting and receiving antenna in response to a radio wave propagation environment.

Conventionally, as countermeasures against fading, there have been proposed methods, such as a method for controlling the directivity of a transmitting and receiving antenna, and a method for controlling various diversity processes. For example, each of Patent Literatures 1 to 3 discloses a directional pattern determining method according to the prior art, involving reception of radio signals in response to changes of a radio wave propagation environment over time.

The invention of Patent Literature 4 is also a directional pattern determining method according to the prior art, involving reception of radio signals in response to changes of a radio wave propagation environment over time. According to this invention, a memory stores, in advance, data for producing a plurality of different directional patterns. These directional patterns are classified into two types: i.e., a weak electric field group consisting of directional patterns each having a relatively wide beam width, and a strong electric field group consisting of directional patterns each having a relatively narrow beam width. At first, one of the groups is selected based on a range of a first parameter measured (e.g., a received signal strength indicator; hereinafter, referred to as RSSI). Next, an optimum directional pattern is determined based on a second parameter measured while sequentially setting the directional patterns of the selected group (e.g., a signal power to noise power ratio; hereinafter, referred to as SNR).

Citation List

Patent Literature

PATENT LITERATURE 1: Japanese Patent Laid-open Publication No. 2000-134023.

PATENT LITERATURE 2: Japanese Patent Laid-open Publication No. 2005-142866.

PATENT LITERATURE 3: Japanese Patent Laid-open Publication No. H08-172423.

PATENT LITERATURE 4: PCT International Publication No. WO2009/144930.

SUMMARY OF INVENTION

Technical Problem

However, this invention of Patent Literature 4 has the following problems. According to this invention, when classifying the directional patterns into groups, for example, the RSSI is associated with the beam width; the directional patterns having the narrow beam width are classified into the strong electric field group, and the directional patterns having the wide beam width are classified into the weak electric field group. In this case, if one group includes two or more directional patterns having slightly different directional beams and steered in the same direction, there is a high possibility that the second parameters (i.e., SNR) with substantially the same value are obtained as a result of measurement carried out while sequentially setting these directional patterns. Thus, although it is not so needed to establish communications using all of these similar directional patterns for measuring the second parameter, it results in wasting more processing times until an optimum directional pattern is determined, thus degrading the abilities of tracking and changing the directional pattern in response to variations in a radio wave propagation environment.

The object of the present invention is to provide a directional pattern determining method in a wireless communication apparatus provided with a steerable antenna device, capable of solving the above problems, and capable of tracking variations in a radio wave propagation environment and quickly determining an optimum directional pattern.

Solution to Problem

According to an aspect of the present invention, a directional pattern determining method is provided for a wireless communication apparatus including at least one steerable antenna device, and a directional pattern memory for storing data on a plurality of directional patterns to be set for the steerable antenna device. The method includes the steps of: classifying the plurality of directional patterns into groups and storing the directional patterns in the directional pattern memory, such that among the plurality of directional patterns, the directional patterns strongly correlated with each other are classified into the same group, while the directional patterns weakly correlated with each other are classified into the different groups; selecting one directional pattern from each group in the directional pattern memory; determining one directional pattern from the selected directional patterns, in accordance with a first communication quality of signals each received when each one of the selected directional patterns is set for the steerable antenna element; and setting the determined directional pattern for the steerable antenna element.

In the directional pattern determining method, the plurality of directional patterns are stored in the directional pattern memory, such that the plurality of directional patterns are ordered for each classified group based on a second communication quality. The selecting step includes a step of selecting one directional pattern from each group in the directional pattern memory, in accordance with the second communication quality of a signal received when an initial directional pattern is set for the steerable antenna element.

In the directional pattern determining method, the step of classifying the plurality of directional patterns into groups and storing the directional patterns in the directional pattern memory includes steps of; defining functions each representing a directional pattern with respect to an azimuth angle; and calculating a correlation of each pair of the directional patterns as a cross correlation function of the functions representing the pair of the directional patterns, respectively.

In the directional pattern determining method, the calculating step includes steps of: for the each pair of the directional patterns, calculating a cross correlation function on an X-Y plane, a cross correlation function on a Y-Z plane and a cross correlation function on a Z-X plane, and obtaining a combined cross correlation function by combining the calculated cross correlation functions with each other using predetermined weights.

In the directional pattern determining method, the calculating step includes steps of: for the each pair of the directional patterns, calculating a cross correlation function of a vertically polarized component and a cross correlation function of a horizontally polarized component; and obtaining a combined cross correlation function by combining the calculated cross correlation functions with each other using predetermined weights.

In the directional pattern determining method, each of the directional patterns is a combined directional pattern including the respective directional patterns of the plurality of steerable antenna devices. The calculating step includes steps of: for the each pair of the directional patterns, separately calculating cross correlation functions for the respective steerable antenna devices; and obtaining a combined cross correlation function by combining the calculated cross correlation functions with each other using predetermined weights.

The directional pattern determining method further includes the steps of: measuring a third communication quality of signals each received when one of the directional patterns is set for the steerable antenna element, and acquiring a cumulative distribution of numbers of measurements for each measurement value of a plurality of different measurement values of the third communication quality; and updating the groups of the directional patterns stored in the directional pattern memory, such that among the plurality of directional patterns, the directional patterns having cumulative distributions strongly correlated with each other are classified into the same group, while the directional patterns having cumulative distributions weakly correlated with each other are classified into the different groups.

Advantageous Effects of Invention

Among a plurality of available combined directional patterns, the combined directional patterns strongly correlated with each other are classified into the same group, while the combined directional patterns weakly correlated with each other are classified into different groups. From each group of the combined directional patterns, one combined directional pattern is selected as a candidate optimum combined directional pattern, the directional pattern is changed according to the selected combined directional patterns. Thus, it is possible to efficiently prevent combined directional patterns expected to exhibit the same transmission characteristics, from being selected as candidates, to reduce a time required until an optimum combined directional pattern is determined, and to improve the abilities of tacking and changing the directional pattern in response to variations in a radio wave propagation environment. Further, by selecting combined directional patterns weakly correlated with each other and changing the directional pattern according to the selected combined directional patterns, it is possible to obtain different transmission characteristics for the respective combined, directional patterns, and to improve an effect of changing the directional pattern.

BRIEF DESCRIPTION OF DRAWINGS

FIG. 10 is a table showing correlations among the combined directional patterns Pa to Ph of FIGS. 2 to 9.

FIG. 13 is a diagram showing relations between an output range of a function f (RSSI1, RSSI2, RSSI3) of step S4 of FIG. 12 and combined directional patterns selected from each of groups G1 to G4.

FIG. 22 is a table showing cumulative distribution of numbers of measurements for each measurement value of a communication quality measured by the processes of FIGS. 20 and 21.

FIG. 23 is a table showing contents of a combined directional pattern memory 104*m* updated by the processes of FIGS. 20 and 21.

DESCRIPTION OF EMBODIMENTS

Preferred embodiments of the present invention will be described below with reference to the drawings.

First Embodiment

Figure 1:
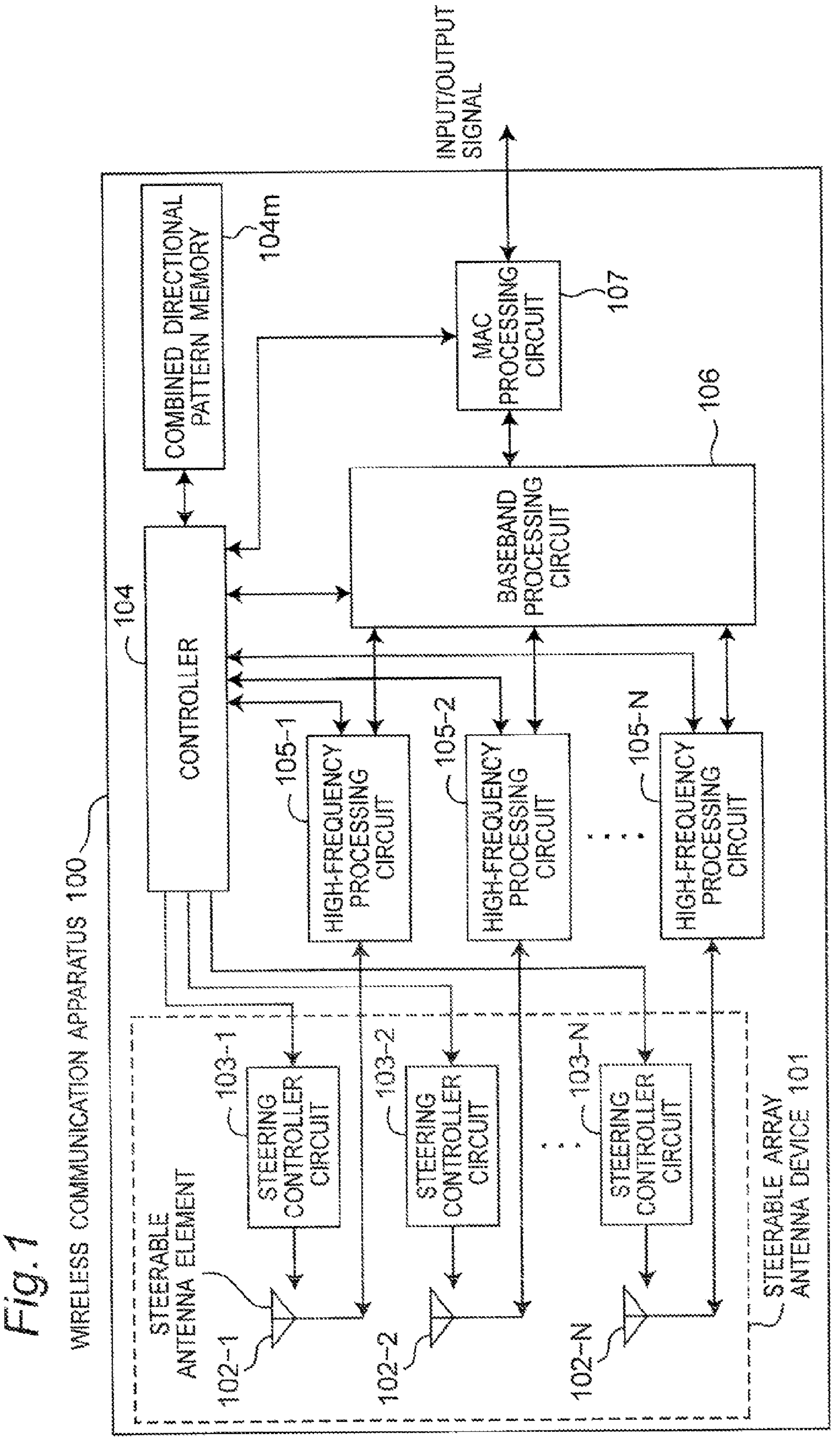
FIG. 1 is a block diagram showing a configuration of a wireless communication apparatus 100 according to a first embodiment of the present invention.
Figure 2:
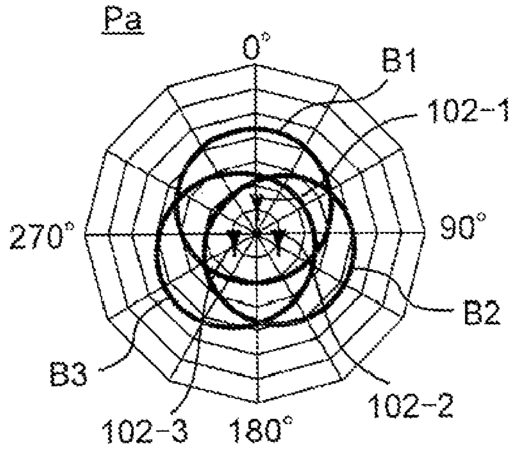
FIG. 2 is a pattern diagram showing a first combined directional pattern Pa to be set for steerable antenna elements 102-1 to 102-3 of FIG. 1.
Figure 3:
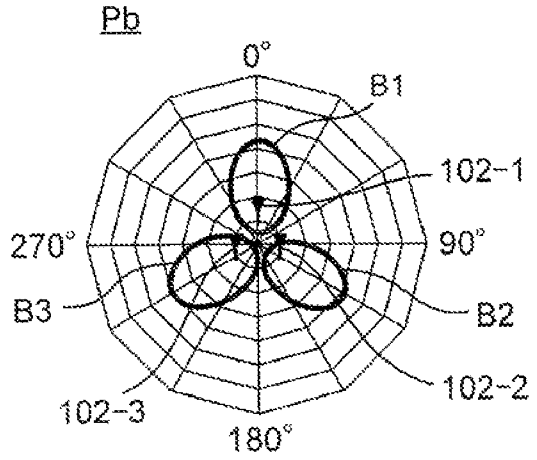
FIG. 3 is a pattern diagram showing a second combined directional pattern Pb to be set for the steerable antenna elements 102-1 to 102-3 of FIG. 1.
Figure 4:
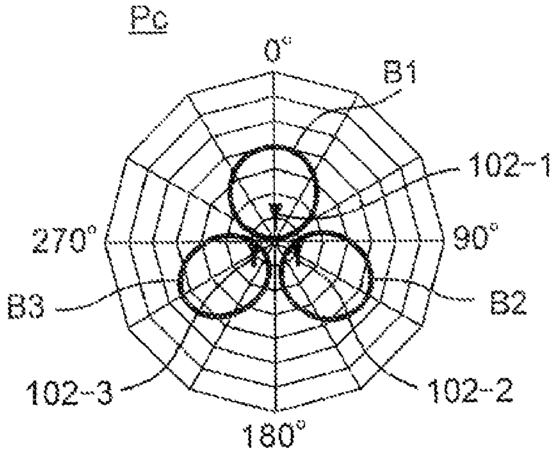
FIG. 4 is a pattern diagram showing a third combined directional pattern Pc to be set for the steerable antenna elements 102-1 to 102-3 of FIG. 1.
Figure 5:
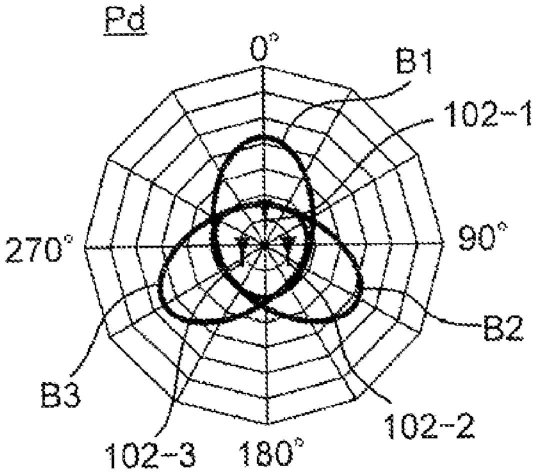
FIG. 5 is a pattern diagram showing a fourth combined directional pattern Pd to be set for the steerable antenna elements 102-1 to 102-3 of FIG. 1.
Figure 6:
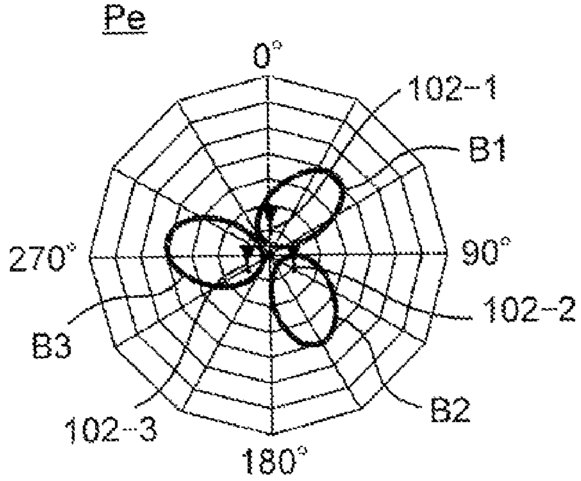
FIG. 6 is a pattern diagram showing a fifth combined directional pattern Pe to be set for the steerable antenna elements 102-1 to 102-3 of FIG. 1.
Figure 7:
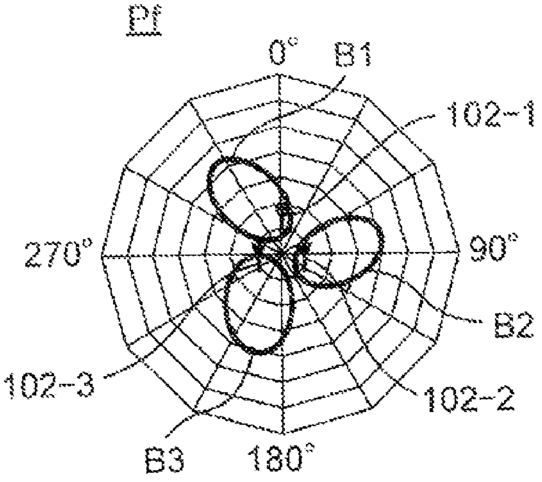
FIG. 7 is a pattern diagram showing a sixth combined directional pattern Pf to be set for the steerable antenna elements 102-1 to 102-3 of FIG. 1.
Figure 8:
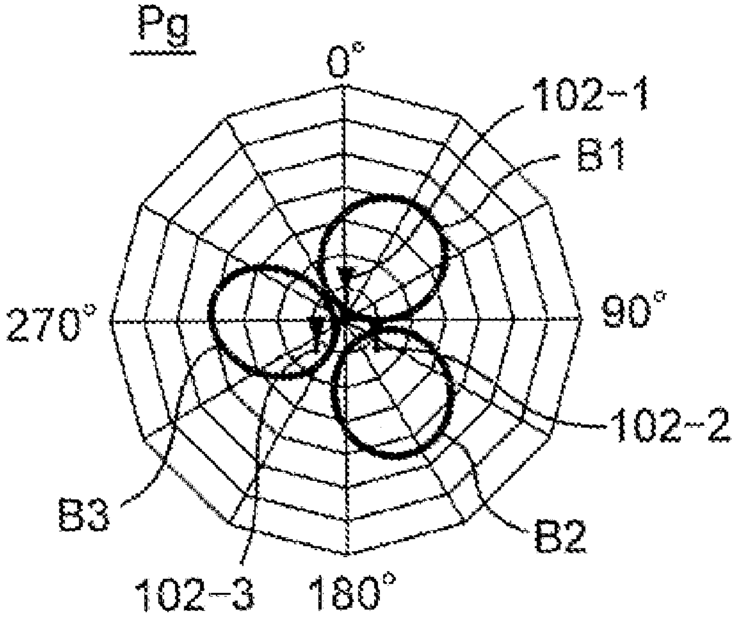
FIG. 8 is a pattern diagram showing a seventh combined directional pattern Pg to be set for the steerable antenna elements 102-1 to 102-3 of FIG. 1.
Figure 9:
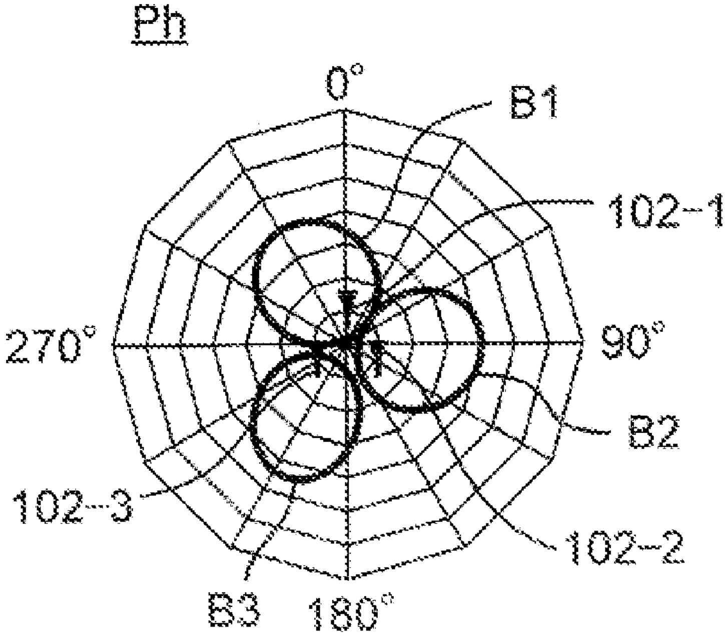
FIG. 9 is a pattern diagram showing an eighth combined directional pattern Ph to be set for the steerable antenna elements 102-1 to 102-3 of FIG. 1.

FIG. 1 is a block diagram showing a configuration of a wireless communication apparatus 100 according to a first embodiment of the present invention. The wireless communication apparatus 100 is provided with: a steerable array antenna device 101 including a plurality of steerable antenna elements 102-1 to 102-N and a plurality of steering controller circuits 103-1 to 103-N; high-frequency processing circuits 105-1 to 105-N; a baseband processing circuit 106; a MAC (Media Access Control) processing circuit 107; a controller 104; and a combined directional pattern memory 104*m*.

Directional patterns of the respective steerable antenna elements 102-1 to 102-N are controlled by the corresponding steering controller circuits 103-1 to 103-N, respectively. Thus, the steerable antenna elements 102-1 to 102-N and the steering controller circuits 103-1 to 103-N operate as a plurality of steerable antenna devices. For example, in a case where each steerable antenna element is configured to have a feeding antenna element and one or more parasitic elements, the directional patterns of the respective steerable antenna elements 102-1 to 102-N are changed by, e.g., switching between ON and OFF of the parasitic elements each provided close to the feeding antenna element. In the present embodiment, a set of the plurality of N directional patterns set for the respective steerable antenna elements 102-1 to 102-N is referred to as "a combined directional pattern". The combined directional pattern memory 104*m* stores data for setting different combined directional patterns each consisting of a different set of directional patterns. Accordingly, any of the combined directional patterns stored in the combined directional pattern memory 104*m* is selectively set for the steerable antenna elements 102-1 to 102-N.

Now, operations of the wireless communication apparatus 100 will be described. Packets of data streams transmitted from a transmitter-side wireless terminal device (not shown) using the MIMO transmission scheme arrive at and are received by the plurality of N steerable antenna elements 102-1 to 102-N. The received data streams are processed by the high-frequency processing circuits 105-1 to 105-N for amplification and A/D conversion, etc., and then are input to the baseband processing circuit 106. The baseband processing circuit 106 reconstructs one original data stream from the N data streams. The reconstructed data stream is processed for MAC by the MAC processing circuit 107, and then is output as an output signal from the wireless communication apparatus 100. When input signals to be transmitted arrive at the MAC processing circuit, these signals are processed in a reverse direction in the wireless communication apparatus 100, and finally, radio signals of data streams to be transmitted using the MIMO transmission scheme are emitted from the steerable antenna elements 102-1 to 102-N. The controller 104 inputs to the steering controller circuits 103-1 to 103-N, control signals corresponding to any of the combined directional patterns stored in the combined directional pattern memory 104*m*, thus making the steering controller circuits 103-1 to 103-N respectively control the directional patterns of the steerable antenna elements 102-1 to 102-N to produce the combined directional pattern. Particularly, the controller 104 executes a directional pattern determining process described below (see FIG. 12), and thus, determines an optimum combined directional pattern from the combined directional patterns stored in the combined directional pattern memory 104*m*, and makes the steerable antenna elements 102-1 to 102-N set to the optimum combined directional pattern. In addition, the controller 104 acquires and uses information on a radio wave propagation environment and/or communication qualities (e.g., RSSI, SNR, and/or PHY rate) from at least one of the high-frequency processing circuits 105-1 to 105-N, the baseband processing circuit 106, and the MAC processing circuit 107, for executing the directional pattern determining process.

The directional pattern determining method according to the embodiment of the present invention will be described below, with reference to an exemplary case where the wireless communication apparatus 100 of FIG. 1 is configured to have three steerable antenna elements 102-1 to 102-3, three steering controller circuits 103-1 to 103-3, and three high-frequency processing circuits 105-1 to 105-3, and receives packets using the MIMO transmission scheme.

Figures 11, 12:
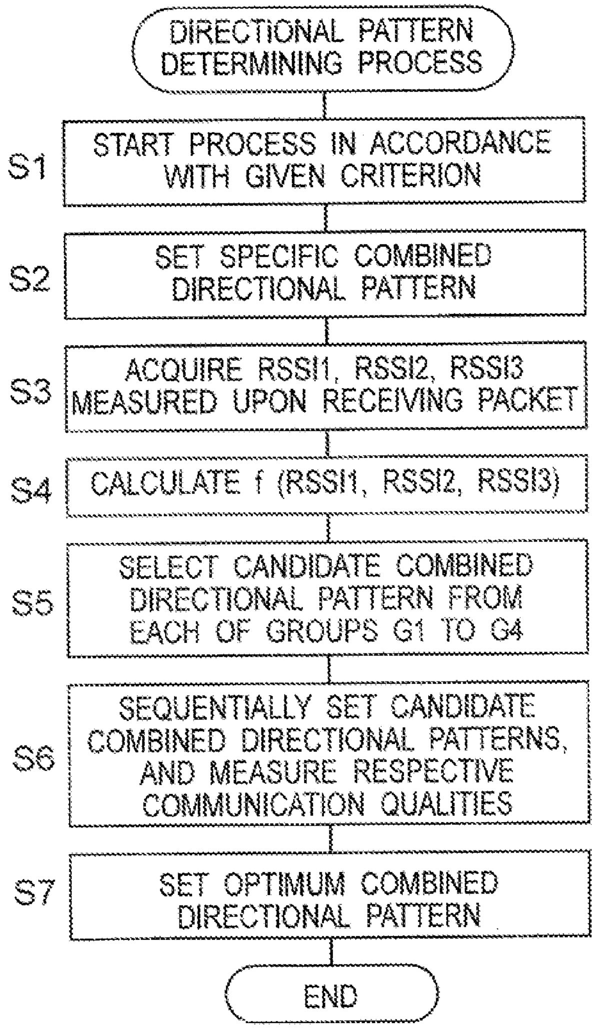
FIG. 11 is a table showing contents of a combined directional pattern memory 104*m* of FIG. 1.
FIG. 12 is a flowchart showing a directional pattern determining process executed by a controller 104 of FIG. 1.

FIGS. 2 to 9 are pattern diagrams showing combined directional patterns Pa to Ph to be set for the steerable antenna elements 102-1 to 102-3 of FIG. 1. FIGS. 2 to 9 schematically show combined directional patterns of a certain polarized component on a plane where the steerable array antenna device 101 is located, e.g., a vertically polarized component on an X-Y plane. Directional patterns B1 to B3 are set for the respective steerable antenna elements 102-1 to 102-3. Each of the combined directional patterns Pa to Ph is a set of these three directional patterns B1 to B3. In a case of setting eight-state combined directional patterns as shown in FIGS. 2 to 9, it is possible to use 3-bit control signals Sa to Sh. These eight combined directional patterns Pa to Ph are classified into a predetermined number of groups (in the present embodiment, four groups) based on correlations among the combined directional patterns. For example, in both the combined directional patterns Pa and Pd, each of the directional patterns B1 to B3 has significant levels in two directions, i.e., in a certain direction with respect to the corresponding one of the steerable antenna elements 102-1 to 102-3, and in its opposite direction. Therefore, it can be said that the combined directional patterns Pa and Pd are strongly correlated with each other. Further, in each pair of the combined directional patterns Pb and Pc, the combined directional patterns Pe and Pg, and the combined directional patterns Pf and Ph, each of the directional patterns B1 to B3 of one combined directional pattern has the same main beam direction and a different beam width as those of the corresponding directional pattern of the other combined directional pattern. Therefore, it can be said that these pairs of combined directional patterns are strongly correlated with each other. FIG. 10 is a table showing the correlations among the combined directional patterns Pa to Ph of FIGS. 2 to 9. For simplification, in FIG. 10, "1" denotes a strongly correlated pair and "0" denotes a lowly correlated pair. The eight combined directional patterns Pa to Ph are classified into the four groups based on the correlation levels as shown in FIG. 10, and the classified combined directional patterns are stored in the combined directional pattern memory 104*m*. FIG. 11 is a table showing contents of the combined directional pattern memory 104*m* of FIG. 1. The combined directional patterns of the same group, e.g., the combined directional patterns Pa and Pd in the group G1 are strongly correlated with each other, and the combined directional patterns of different groups, e.g., the combined directional pattern Pa in the group G1 and the six combined directional patterns in the groups G2 to G4 are weakly correlated with each other. The combined directional pattern memory 104*m* of the present embodiment stores the control signals Sa to Sh for producing the combined directional patterns Pa to Ph classified into these groups. A method for classifying the combined directional patterns into groups will be described later in a second embodiment of the present invention.

FIG. 12 is a flowchart showing a directional pattern determining process executed by the controller 104 of FIG. 1. The directional pattern determining method using the combined directional pattern memory 104*m* will be now described with reference to this flowchart. At first, in step S1, the controller 104 starts the directional pattern determining process in accordance with a predetermined criterion. As the criterion, for example, the process may be started when the wireless communication apparatus 100 is turned on, or when the number of received data packets per unit time destined to the wireless communication apparatus 100 and notified by the MAC processing circuit 107 exceeds a threshold value. Then in step S2, the controller 104 inputs the control signal Sa to the steering controller circuits 103-1 to 103-3 for making the steerable antenna elements 102-1 to 102-3 set to a certain initial combined directional pattern, e.g., the combined directional pattern Pa of FIG. 2. The steering controller circuits 103-1 to 103-3 receiving the control signal Sa control the steerable antenna elements 102-1 to 102-3 so as to produce the combined directional pattern Pa. Then in step S3, the controller 104 acquires information on a communication quality measured when receiving packets, from at least one of the high-frequency processing circuits 105-1 to 105-3, the baseband processing circuit 106, and the MAC processing circuit 107. In the present embodiment, received field strengths RSSI1, RSSI2 and RSSI3 at the respective steerable antenna elements 102-1 to 102-3, measured by the three high-frequency processing circuits 105-1 to 105-3, are used as the information on the communication quality. In step S4, the controller 104 substitutes the acquired strengths RSSI1 to RSSI3 to a predetermined function f (RSSI1, RSSI2, RSSI3) to obtain an output value of the function f. The function f is used for roughly estimating the performance in a current propagation environment, and does not require strict calculation. For example, any of an average value, a maximum value, a minimum value and a median value (i.e., values other than the maximum value and the minimum value) of the three strengths RSSI1 to RSSI3 can be used as the function f. Then in step S5, the controller 104 looks up the combined directional pattern memory 104*m* based on a range of the output value of the function f, and selects one combined directional pattern from each of the groups G1 to G4 as a candidate optimum combined directional pattern.

FIG. 13 is a diagram showing relations between the output range of the function f (RSSI1, RSSI2, RSSI3) of step S4 of FIG. 12 and the combined directional patterns selected from each of the groups G1 to G4. Data corresponding to the relations of FIG. 13 may be held by the controller 104 or by the combined directional pattern memory 104*m*. The combined directional patterns of each of the groups G1 to G4 are ordered based on a predetermined criterion, and are associated with threshold values T0 to T3 for the output value of the function f. As shown in FIG. 13, from each of the groups G1 to G4, only one of the two combined directional patterns is selected based on which of ranges defined by the threshold values T0 to T3 include the output value of the function f. For example, if the output value of the function f is equal to T0 or more, and is less than T1, then in FIG. 11, the combined directional pattern Pd is selected from the group G1, the combined directional pattern Pb is selected from the group G2, the combined directional pattern Pe is selected from the group G3, and the combined directional pattern Pf is selected from the group G4. The combined directional patterns of the same group are strongly correlated with each other, so that these combined directional patterns are expected to exhibit a similar transmission characteristics. Therefore, by performing communication test with only one of combined directional patterns from each group being selected, a sufficient communication quality is measured for determining an optimum combined directional pattern. The order of the combined directional patterns in each of the groups G1 to G4 is determined, e.g., as follows. For example, in the case of the group G1, the order of the combined directional patterns is determined such that under weak received power ($f<T0$), the combined directional pattern Pa with a wide beam width is selected for receiving more radio waves, and in contrast, under strong received power ($f>T3$), the combined directional pattern Pd with a narrow beam width is selected for reducing correlations among the directional patterns B1 to B3 since the transmitter-side wireless terminal device is considered to be located closely. With respect to the other ranges defined by the threshold values T0 to T3, the order of the combined directional patterns can be determined, e.g., based on which of the combined directional patterns have a higher probability of better characteristics by measuring under a plurality of test environments in advance. FIG. 13 shows a case where the combined directional pattern Pd exhibits better characteristics in the ranges of $f>T0$. Although there is a high possibility that combined directional patterns Pa and Pd exhibit similar characteristics under the same situation due to their strong correlation with each other, their order should be determined in advance based on their slight difference as described above. The order of the combined directional patterns Pa and Pd is not limited to an initial setting, and may be changed by learning characteristics for a preferred combined directional pattern during an actual communication. With regard to the other groups G2 to G4, the orders of the combined directional patterns can be determined in a similar manner.

After selecting the candidate optimum combined directional patterns in step S5, then in step S6, the controller 104 inputs control signals to the steering controller circuits 103-1 to 103-3 so as to sequentially set the selected candidate combined directional patterns, and the steering controller circuits 103-1 to 103-3 receiving the control signals control the steerable antenna elements 102-1 to 102-3 so as to produce the respective combined directional patterns. At this time, every time a different combined directional pattern is set, the controller 104 acquires information on the communication quality measured when receiving packets, e.g., an SNR or a packet error rate (hereinafter, referred to as PER), from at least one of the high-frequency processing circuits 105-1 to 105-3, the baseband processing circuit 106, and the MAC processing circuit 107. Then in step S7, the controller 104 determines an optimum combined directional pattern, and inputs control signals to the steering controller circuits 103-1 to 103-3 so as to set the determined combined directional pattern, and the steering controller circuits 103-1 to 103-3 receiving the control signals control the steerable antenna elements 102-1 to 102-3 so as to produce the combined directional pattern. When determining an optimum combined directional pattern, for example, it is possible to perform packet communication tests for all the combined directional patterns selected in step S5, to compare information on the respective measured communication quality, and thus, to determine a combined directional pattern exhibiting the best transmission characteristic as an optimum combined directional pattern. Alternatively, for the purpose of reducing a time required for the determination, it is possible to sequentially set the combined directional patterns selected in step S5, to perform packet communication tests for the combined directional patterns, and at the time when a combined directional pattern satisfying a communication quality required for a desired application is found, to determine the combined directional pattern set at this time as an optimum combined directional pattern.

In the wireless communication apparatus 100 according to the present embodiment, the steering controller circuits 103-1 to 103-N, the controller 104, and the combined directional pattern memory 104*m* may be implemented with hardware or may be implemented with software, respectively. In addition, the directional pattern of each of the steerable antenna elements 102-1 to 102-N can be changed using any method known to those skilled in the art.

The directional patterns of the steerable antenna elements 102-1 to 102-N are not limited to the embodiment that these directional patterns are handled as "combined directional pattern" corresponding to a set of a plurality of N directional patterns, and may be handled separately. For example, the principle of the present embodiment can be applied in a case where a plurality of directional patterns are set for at least one steerable antenna element.

Hence, according to the configurations described above, when determining an optimum combined directional pattern, it is possible to eliminate losses in processing times for setting combined directional patterns expected to exhibit similar transmission characteristics among a large number of available combined directional patterns, and thus, to reduce a time for performing communication tests required until the optimum combined directional pattern is determined. As described above, according to the embodiment of the present invention, it is possible to implement a directional pattern determining method capable of quickly tracking and changing the directional patterns in response to variations in a radio wave propagation environment.

Second Embodiment

Figure 25:
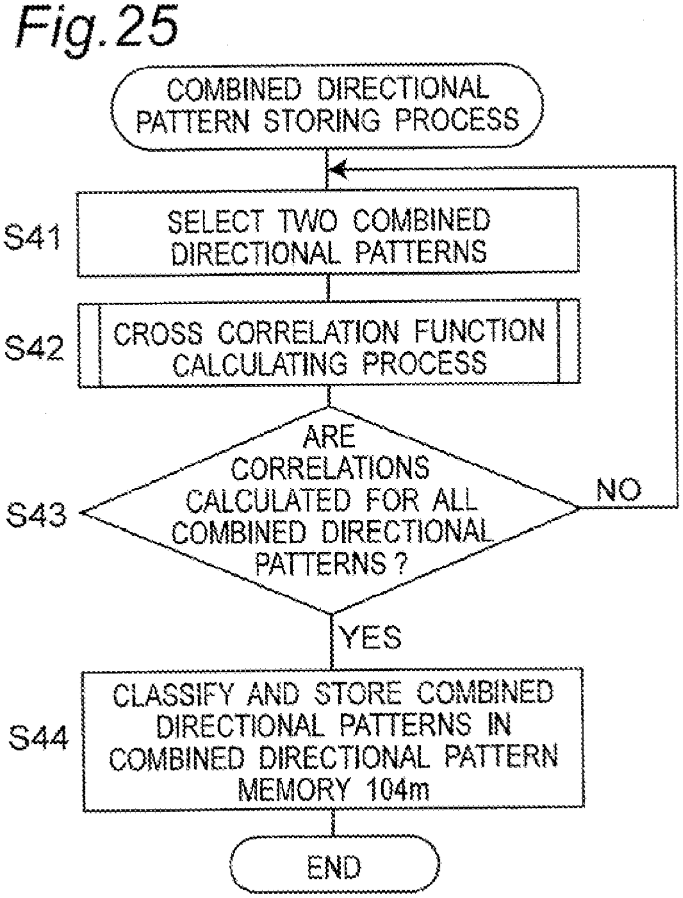
FIG. 25 is a flowchart showing a combined directional pattern storing process according to the second embodiment of the present invention.

In a second embodiment of the present invention, a method for classifying a plurality of combined directional patterns into groups will be described. FIG. 25 is a flowchart showing a combined directional pattern storing process according to the second embodiment of the present invention. In step S41 of FIG. 25, a controller 104 selects any two combined directional patterns from a plurality of combined directional patterns to be set for a wireless communication apparatus 100, and sets the selected two combined directional patterns for steerable antenna elements 102-1 to 102-3. Then in step S42, the controller 104 executes a cross correlation function calculating process described below. In step S43, the controller 104 determines whether or not cross correlation functions are calculated for all the combined directional patterns; if "Yes", then the flow proceeds to step S44; if "No", then the flow returns to step S41, and the controller 104 selects other two combined directional patterns and repeats the process. In step S44, the controller 104 classifies the combined directional patterns based on the calculated cross correlation functions, and stores the combined directional patterns in a combined directional pattern memory 104*m*.

Figure 14A:
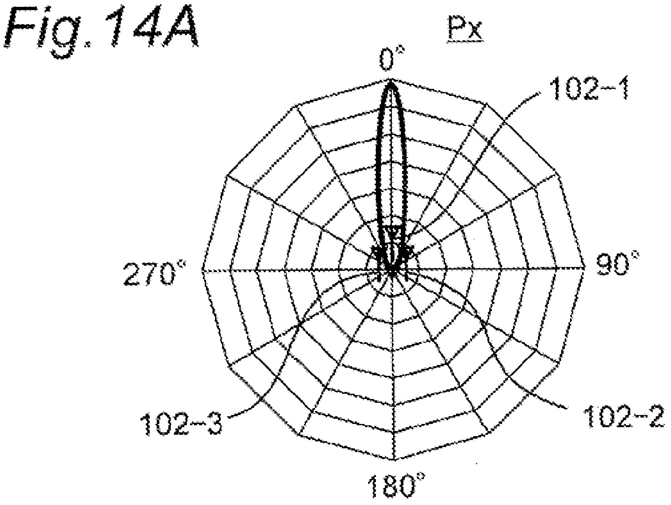
FIG. 14A is a pattern diagram for illustrating a method for classifying combined directional patterns according to a second embodiment of the present invention, and showing an exemplary first combined directional pattern Px to be set for steerable antenna elements 102-1 to 102-3.
Figure 14B:
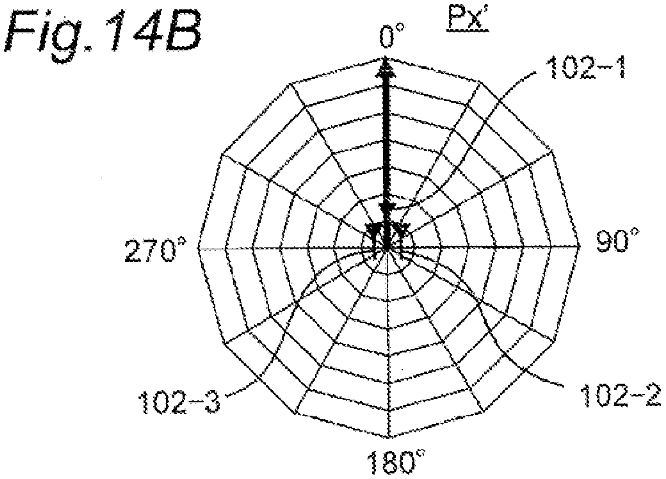
FIG. 14B is a diagram showing a combined directional pattern vector Px' corresponding to the combined directional pattern Px of FIG. 14A.
Figure 15A:
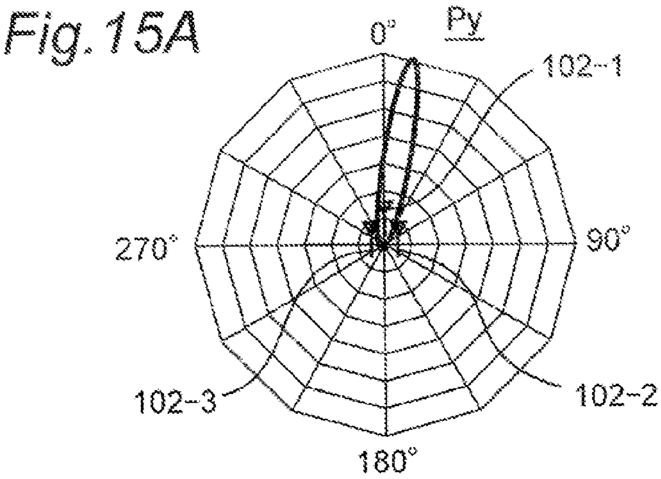
FIG. 15A is a pattern diagram for illustrating the method for classifying combined directional patterns according to the second embodiment of the present invention, and showing an exemplary second combined directional pattern Py to be set for the steerable antenna elements 102-1 to 102-3.
Figure 15B:
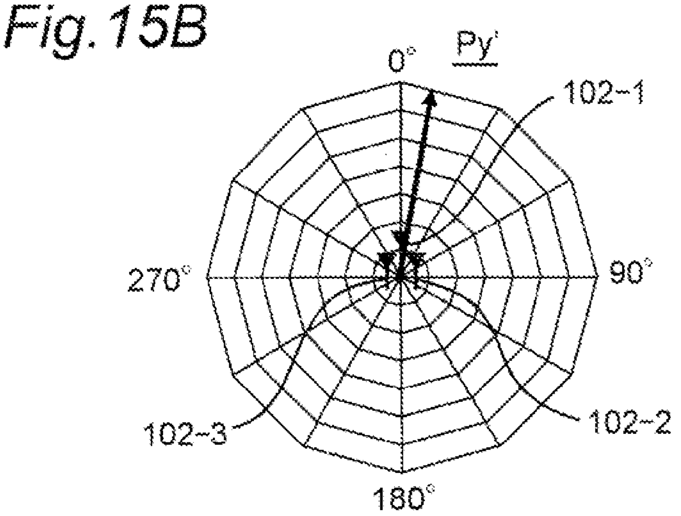
FIG. 15B is a diagram showing a combined directional pattern vector Py' corresponding to the combined directional pattern Py of FIG. 15A.
Figure 16A:
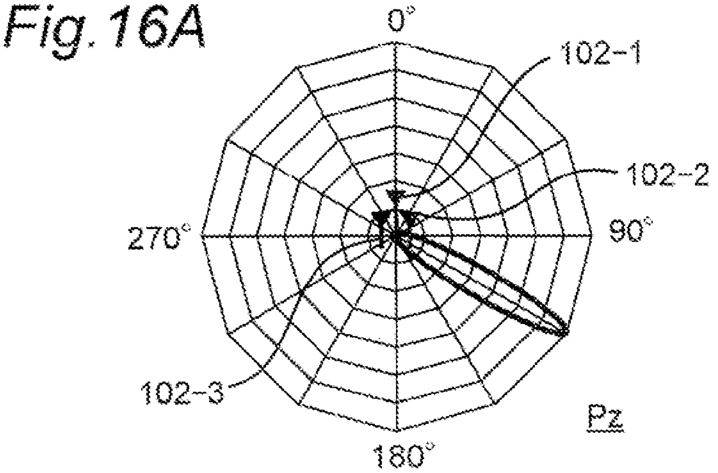
FIG. 16A is a pattern diagram for illustrating the method for classifying combined directional patterns according to the second embodiment of the present invention, and showing an exemplary third combined directional pattern Pz to be set for the steerable antenna elements 102-1 to 102-3.
Figure 16B:
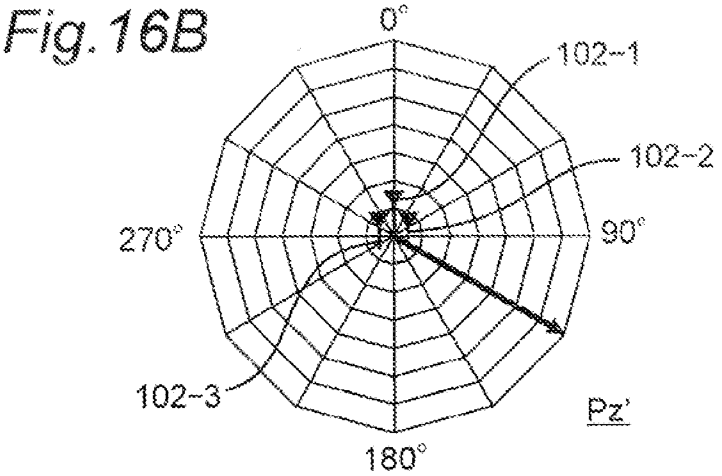
FIG. 16B is a diagram showing a combined directional pattern vector Pz' corresponding to the combined directional pattern Pz of FIG. 16A.

Now, the combined directional pattern storing process, in particular, the cross correlation function calculating process S42 will be described with reference to exemplary combined directional patterns. FIG. 14A is a pattern diagram showing an exemplary first combined directional pattern Px to be set for the steerable antenna elements 102-1 to 102-3. FIG. 14B is a diagram showing a combined directional pattern vector Px' corresponding to the combined directional pattern Px of FIG. 14A. FIG. 15A is a pattern diagram showing an exemplary second combined directional pattern Py to be set for the steerable antenna elements 102-1 to 102-3. FIG. 15B is a diagram showing a combined directional pattern vector Py' corresponding to the combined directional pattern Py of FIG. 15A. FIG. 16A is a pattern diagram showing an exemplary third combined directional pattern Pz to be set for the steerable antenna elements 102-1 to 102-3. FIG. 16B is a diagram showing a combined directional pattern vector Pz' corresponding to the combined directional pattern Pz of FIG. 16A. For example, each of the combined directional patterns or FIGS. 14A, 15A and 16A shows a vertically polarized component on an X-Y plane. For example, the combined directional pattern Px has a narrow beam of 10 dB in a direction of 0 degree, the combined directional pattern Py has an narrow beam of 10 dB in a direction of 10 degrees, and the combined directional pattern Pz has an narrow beam of 10 dB in a direction of 120 degrees. The combined directional pattern vectors of FIGS. 14B, 15B and 16B are vectors showing the combined directional patterns of FIGS. 14A, 15A and 16A in a simplified and schematic manner. The combined directional pattern vector Px' has 10 dB at 0 degree, and has 0 dB at the other direction angles. In addition, the combined directional pattern vector Py' has 10 dB at 10 degrees, and has 0 dB at the other direction angles. Further, the combined directional pattern vector Pz' has 10 dB at 120 degrees, and has 0 dB at the other direction angles.

Figure 17:
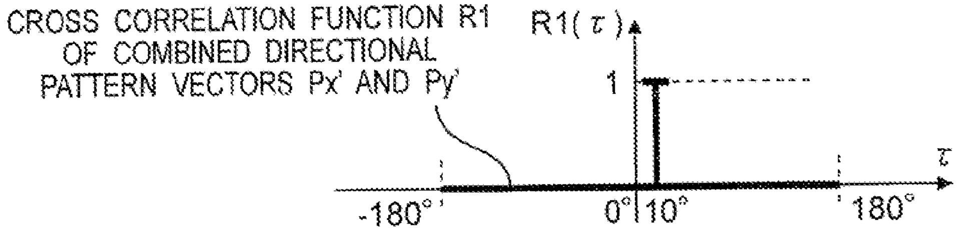
FIG. 17 is a diagram showing a cross correlation function R1 of the combined directional pattern vector Px' of FIG. 14B and the combined directional pattern vector Py' of FIG. 15B.
Figure 18:
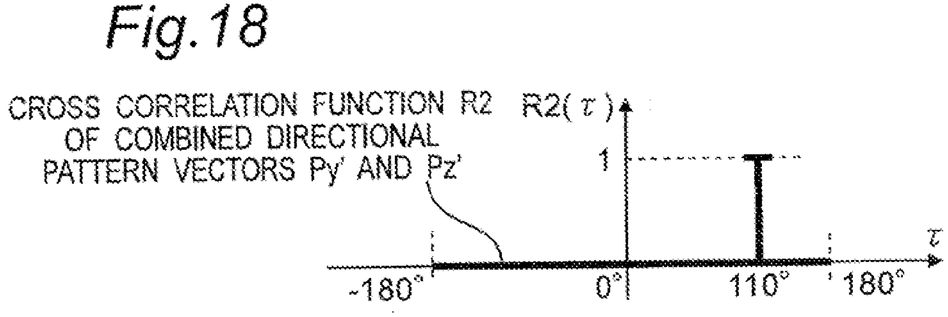
FIG. 18 is a diagram showing a cross correlation function R2 of the combined directional pattern vector Py' of FIG. 15B and the combined directional pattern vector Pz' of FIG. 16B.
Figure 19:
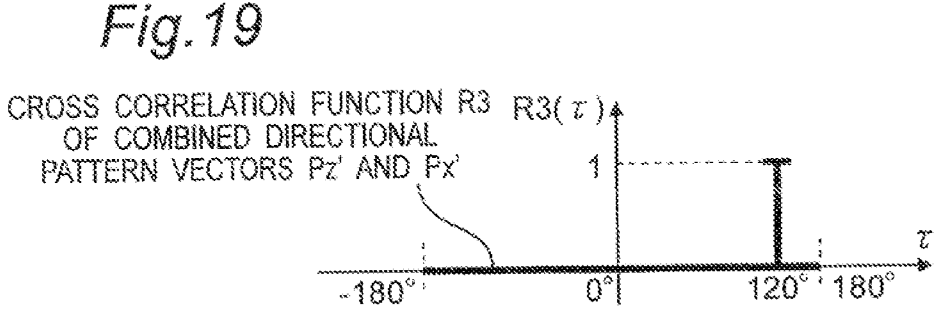
FIG. 19 is a diagram showing a cross correlation function R3 of the combined directional pattern vector Pz' of FIG. 16B and the combined directional pattern vector Px' of FIG. 14B.

In order to classify the combined directional patterns of FIGS. 14A, 15A and 16A into groups, the cross correlation functions of these combined directional patterns are calculated. For ease of explanation, cross correlation functions $R(\tau)$ of the combined directional pattern vectors rather than the combined directional patterns are calculated. FIG. 17 is a diagram showing a cross correlation function R1 of the combined directional pattern vector Px' of FIG. 14B and the combined directional pattern vector Py' of FIG. 15B. FIG. 18 is a diagram showing a cross correlation function R2 of the combined directional pattern vector Py' of FIG. 15B and the combined directional pattern vector Pz' of FIG. 16B. FIG. 19 is a diagram showing a cross correlation function R3 of the combined directional pattern vector Pz' of FIG. 16B and the combined directional pattern vector Px' of FIG. 14B. The cross correlation functions R1, R2 and R3 are normalized, respectively. The cross correlation functions R(τ) of these combined directional pattern vectors can be derived from a well known mathematical expression on an assumption that the combined directional pattern vectors Px', Py' and Pz' are periodic functions in a range from 0 degree to 360 degrees (i.e., from −180 degrees to 180 degrees). In general, a cross correlation function is an even function in which R(τ) is equal to R(−τ). Therefore, each of FIGS. 17 to 19 shows a case where a non-zero correlation value resides at a positive value of a direction angle variable τ. Since the cross correlation functions R1, R2 and R3 of FIGS. 17 to 19 are normalized, the closer the correlation value approaches "0", the weaker the correlation of the two combined directional pattern vectors is, and on the other hand, the closer the correlation value approaches "1", the stronger the correlation of the two combined directional pattern vectors is. The values of the cross correlation functions R1, R2 and R3 at τ=0 degree indicate similarities, i.e., correlations, of two of the combined directional pattern vectors of FIGS. 14B, 15B and 16B when these two are overlapped on one another. In FIGS. 17 to 19, all the values of the cross correlation functions R1, R2 and R3 at τ=0 degree are "0", and the combined directional pattern vectors Px', Py' and Pz' are not correlated with each other. Thus, it is expected that the combined directional patterns Px, Py and Pz exhibit different transmission characteristics from one another during communications, with respective one of the combined directional patterns Px, Py and Pz being set for the steerable antenna elements 102-1 to 102-3. Therefore, the combined directional patterns Px, Py and Pz are classified into different groups and are stored in the combined directional pattern memory 104*m*.

On the other hand, the values of the cross correlation functions R1, R2 and R3 at τ=10 degrees indicate similarities, i.e., correlations, of two of the combined directional pattern vectors in a case where the two combined directional pattern vectors are overlapped with one of the two combined directional patterns being rotated by 10 degrees. In FIGS. 18 and 19, the values of the cross correlation functions R2 and R3 at τ=10 degrees are "0", and on the other hand, in FIG. 17, the value of the cross correlation function R1 at τ=10 degrees is "1". This indicates that each pair of the combined directional pattern vectors Px' and Pz', and the combined directional pattern vectors Py' and Pz' is not correlated even when one of the combined directional pattern vectors is shifted by 10 degrees, but the combined directional pattern vectors Px' and Py' completely match with each other when one of the combined directional pattern vectors is shifted by 10 degrees, and therefore are correlated with each other. For example, in a satellite communication system or the like, since a transmitter-side wireless terminal device and a receiver-side wireless terminal device are sufficiently distant from each other, and radio waves arrive at the receiver-side wireless terminal device over a wide range, it is considered that there is no difference in transmission characteristics during communications, with respective one of the combined directional patterns Px and Py being set for the steerable antenna elements 102-1 to 102-3. In such a case, it is possible to allow for deviations in a direction angle within ±θ degrees, and to determine whether or not the combined directional patterns are correlated with each other, based on a maximum value of a cross correlation function over the allowed range, and thus classifying the combined directional patterns into groups. In a specific case of a radio communication system with an allowed deviation direction angle θ of 30 degrees, the maximum value of the cross correlation function R1 within a range of −30≦τ≦30 is 1, and thus, it is determined that the combined directional pattern vectors Px' are Py' are correlated with each other. On the other hand, the maximum values of the cross correlation functions R2 and R3 within the range of −30≦τ≦30 are "0", and thus, it is determined that the combined directional pattern vectors Px' and Pz' are not correlated with each other, and the combined directional pattern vectors Py' and Pz' are not correlated with each other. Therefore, the combined directional patterns are stored in the combined directional pattern memory 104*m*, such that the combined directional patterns Px and Py are classified into the same group, and the combined directional pattern Pz is classified into a group different from the group of the combined directional patterns Px and Py.

In the above example, the correlation values take a value of "0" or "1", it is determined to be correlated when the correlation value is "1", and it is determined not to be correlated when the correlation value is "0". However, in general, since a normalized correlation value is a continuous value ranging from 0 to 1, it is possible to use a threshold value for determining the correlation. In this case, if a cross correlation function of any two combined directional patterns is equal to or more than the threshold value, it is determined to be correlated (i.e., strongly correlated), so that these combined directional patterns can be classified into the same group. On the other hand, if the cross correlation function is less than the threshold value, it is determined not to be correlated (i.e., weakly correlated), so that these combined directional patterns can be classified into different groups.

Figure 26:
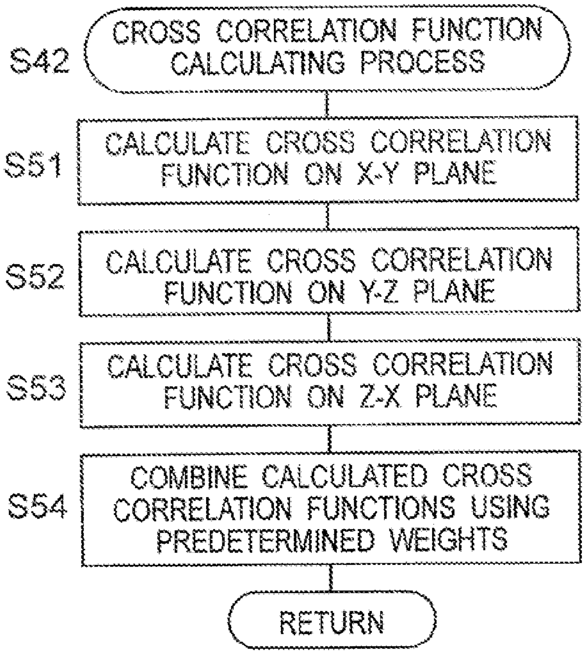
FIG. 26 is a subroutine showing a first implementation example of a cross correlation function calculating process of FIG. 25.
Figure 27:
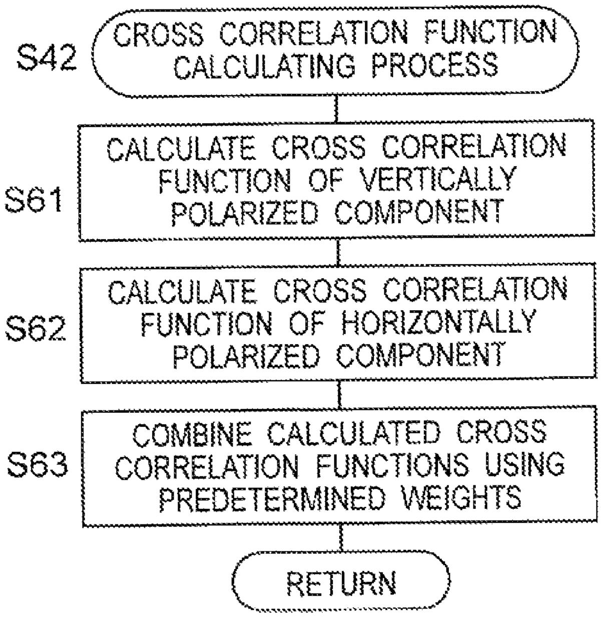
FIG. 27 is a subroutine showing a second implementation example of the cross correlation function calculating process of FIG. 25.
Figure 28:
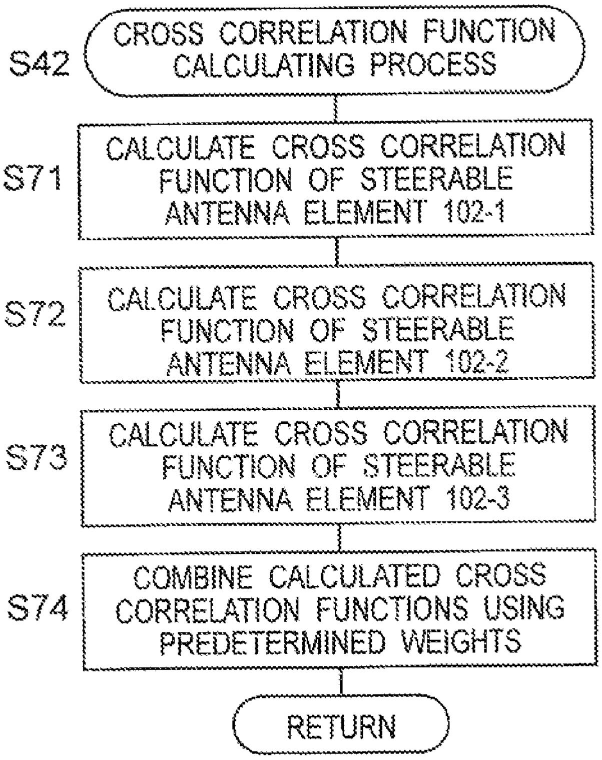
FIG. 28 is a subroutine showing a third implementation example of the cross correlation function calculating process of FIG. 25.

Implementation examples of the cross correlation function calculating process of FIG. 25 will be further described with reference to FIGS. 26 to 28.

In general, an antenna has six directional patterns made of combinations of three different planes (i.e., an X-Y plane, a Y-Z plane and a Z-X plane of a XYZ coordinate) with two different polarized components (i.e., a vertically polarized component and a horizontally polarized component). Therefore, it is possible to calculate cross correlation functions of these directional patterns using the method described above, and to weight cross correlation functions for one of the planes and the polarized components. FIG. 26 shows a case where cross correlation functions are calculated for the three planes (steps S51 to S53) and are combined with each other using predetermined weights (step S54). FIG. 27 shows a case where cross correlation functions are calculated for the two polarized components (steps S61 and S62) and are combined with each other using predetermined weights (step S63). For example, the combined directional pattern Px of FIG. 14A and the combined directional pattern Py of FIG. 15A are set for the steerable antenna elements 102-1 to 102-3, respectively, in order to calculate the cross correlation function of the combined directional patterns Px and Py. In this case, R1 denotes the cross correlation function of the vertically polarized component on the X-Y plane, R4 denotes and the cross correlation function of the horizontally polarized component on the X-Y plane, R5 denotes the cross correlation function of the vertically polarized component on the Y-Z plane, R6 denotes the cross correlation function of the horizontally polarized component on the Y-Z plane, R7 denotes the cross correlation function of the vertically polarized component on the Z-X plane, and R8 denotes the cross correlation function of the horizontally polarized component on the Z-X plane. If the radiation of radio waves on the X-Y plane is important for the wireless communication apparatus 100, a function in which the cross correlation functions on the X-Y plane are combined with each other using more weights (i.e., weighted and added, or linearly combined), e.g., R=(R1+R4)/2, is used as the cross correlation function of the combined directional patterns Px and Py. Further, if the vertically polarized component is important for the wireless communication apparatus 100, a function in which the cross correlation functions of the vertically polarized component are combined with each other using more weights, e.g., R=(R1+R5+R7)/3, is used as the cross correlation function of the combined directional patterns Px and Py.

Further, it is also possible to calculate a cross correlation function of different directional patterns to be set for each of the steerable antenna elements, and to weight and combine the calculated cross correlation functions for the respective steerable antenna elements, and thus, to obtain the cross correlation function of the combined directional patterns. For example, the combined directional pattern Px of FIG. 14A and the combined directional pattern Py of FIG. 15A are set for the steerable antenna elements 102-1 to 102-3, respectively, in order to calculate the cross correlation function of the combined directional patterns Px and Py. In this case, R9 denotes the cross correlation function of the directional patterns of the steerable antenna element 102-1 (step S71 of FIG. 28), R10 denotes the cross correlation function of the directional patterns of the steerable antenna element 102-2 (step S72 of FIG. 28), and R11 denotes the cross correlation function of the directional patterns of the steerable antenna element 102-3 (step S73 of FIG. 28). In this case, for example, the wireless communication apparatus 100 uses all the steerable antenna elements 102-1 to 102-3 for receiving, and uses only two of the steerable antenna elements 102-1 to 102-3 (e.g., 102-1 and 102-2) for transmitting, for MIMO communication. If the receiving sensitivity of the receive-only steerable antenna element 102-3 significantly affect the transmission characteristics, a function in which the cross correlation function R11 of the directional patterns of the steerable antenna element 102-3 is combined using more weights (step S74 of FIG. 28), e.g., R=(R9+R10)/4+R11/2, is used as the cross correlation function of the combined directional patterns Px and Py.

The calculations of cross correlation functions are not limited to those described above. For example, it is possible to combine weights for planes, weights for polarized components, weights for steerable antenna elements, and other weights. In addition, it is possible to weight for other planes different from the X-Y plane, the Y-Z plane and the Z-X plane.

It is possible to execute the combined directional pattern storing process according to the present embodiment, e.g., in initial settings prior to shipping from a factory. For example, it is possible to measure combined directional patterns by evaluating the wireless communication apparatus 100 in an anechoic chamber.

According to the method described above, it is possible to fairly classify a plurality of combined directional patterns into groups by calculating cross correlation functions of combined directional patterns in advance. Thus, it is possible to readily implement the directional pattern determining method according to the embodiment of the present invention.

Third Embodiment

Further, it is desirable to update contents of a combined directional pattern memory 104$m$ in response to a radio wave propagation environment. Accordingly, when determining an optimum combined directional pattern from some combined directional patterns selected as candidates, a wireless communication apparatus 100 compares communication qualities measured using the selected combined directional patterns and calculates a correlation of the communication qualities (i.e., similarity of the communication qualities). Thus, the wireless communication apparatus 100 learns a radio wave propagation environment where the wireless communication apparatus 100 is located, and updates the combined directional pattern memory 104$m$ in accordance with this result.

In the present embodiment, among the combined directional patterns stored in the combined directional pattern memory 104$m$ of FIG. 11, the combined directional patterns Pa, Pb, Pe and Pf are used as a candidate 1, and the combined directional patterns Pd, Pc, Pg and Ph are used as a candidate 2. The combined directional pattern of either the candidate 1 or the candidate 2 is selected from each of the groups G1 to G4. When detecting a variation in a radio wave propagation environment, a controller 104 selects and tries the four combined directional patterns of either the candidate 1 or the candidate 2 to determine an optimum combined directional pattern, as well as obtain information required for updating the combined directional pattern memory 104$m$. Thus, the controller 104 obtains information on the respective combined directional patterns for updating four entries of the combined directional pattern memory 104$m$ at one time.

Figure 20:
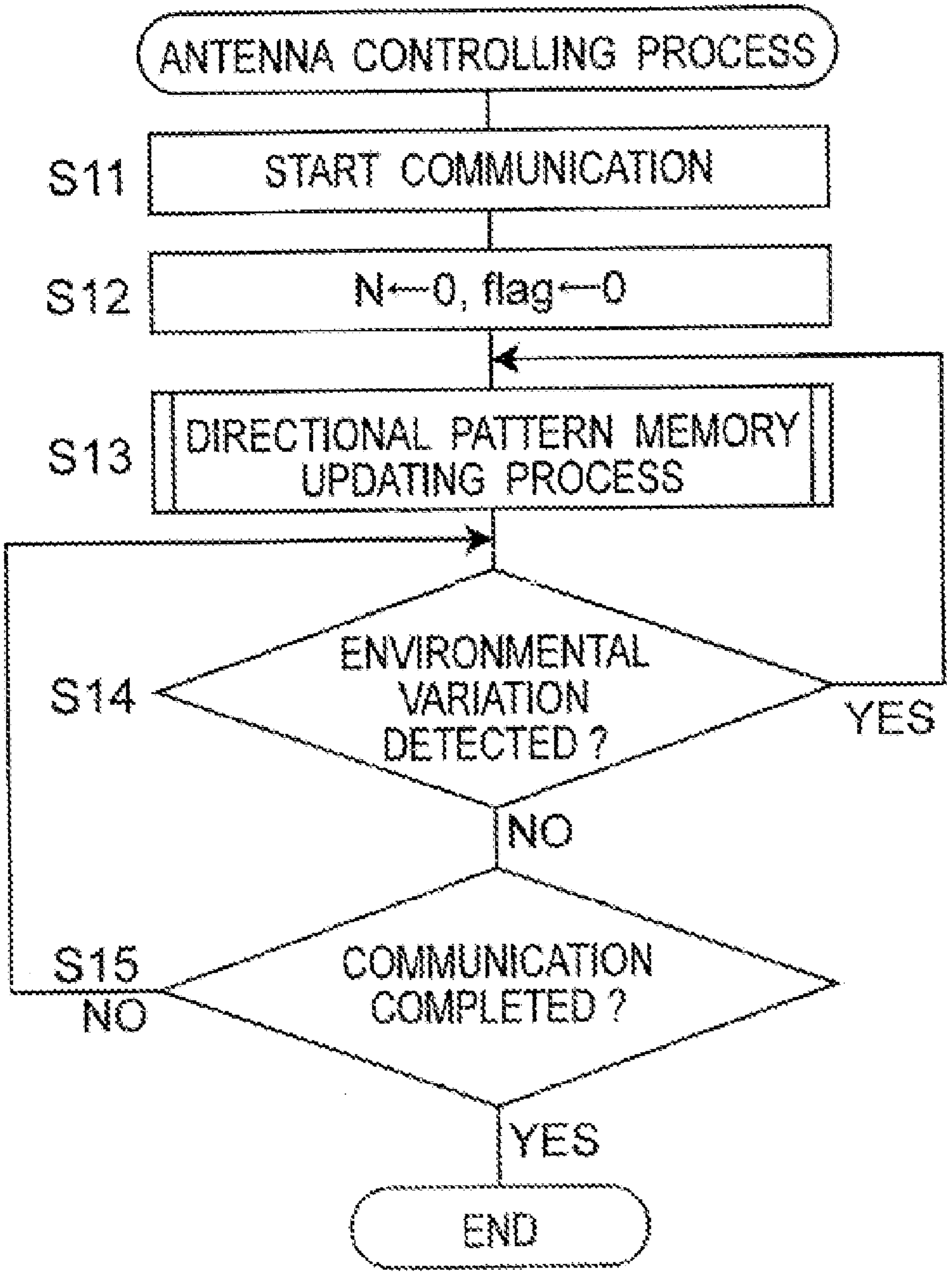
FIG. 20 is a flowchart showing an antenna controlling process according to a third embodiment of the present invention.

FIG. 20 is a flowchart showing an antenna controlling process according to a third embodiment of the present invention. The antenna controlling process of FIG. 20 is executed during communication by the controller 104 of the wireless communication apparatus 100 of FIG. 1. When starting communication in step S11, then in step S12, the controller 104 initializes a number of repeats N to “0”, and also initializes a flag “flag” to “0” for selecting the combined directional pattern of either the candidate 1 or the candidate 2. Then in step S13, the controller 104 executes a directional pattern memory updating process.

Figure 21:
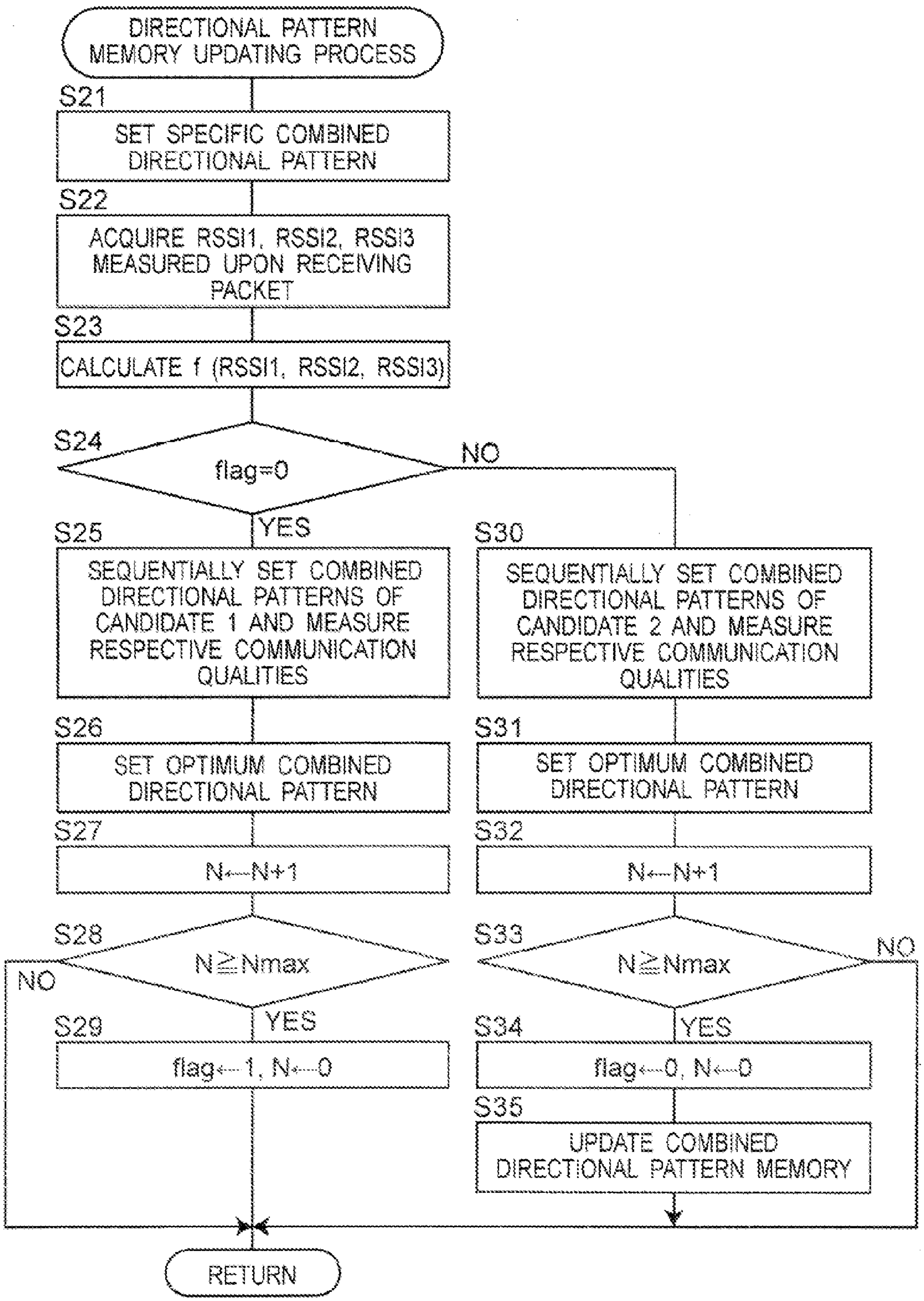
FIG. 21 is a flowchart showing a subroutine of a directional pattern memory updating process of step S13 of FIG. 20.

FIG. 21 is a flowchart showing a subroutine of the directional pattern memory updating process of step S13 of FIG. 20. Steps S21 to S23 are the same as steps S2 to S4 of FIG. 12. In step S24, the controller 104 determines whether or not the flag “flag” is “0”; if Yes, then the flow proceeds to step S25 and subsequent steps using candidate 1; if No (i.e., if the flag “flag” is “1”), then the flow proceeds to step S30 and subsequent steps using the candidate 2. In step S25, the controller 104 controls the steering controller circuits 103-1 to 103-3 so as to sequentially set the combined directional patterns of the candidate 1 for the steerable antenna elements 102-1 to 102-3. Then, every time the different combined directional pattern is set, the controller 104 acquires information on a communication quality (e.g., information on which of PHY rates is achieved) from at least one of the high-frequency processing circuits 105-1 to 105-3, the baseband processing circuit 106, and the MAC processing circuit 107. After obtaining a plurality of different measurement values of the communication quality, the controller 104 records cumulative distribution of numbers of measurements for each measurement value, for updating the combined directional pattern memory 104$m$ (details will be described below). Then in step S26, the controller 104 determines an optimum combined directional pattern, and controls the steering controller circuits 103-1 to 103-3 so as to set the determined combined directional pattern for the steerable antenna elements 102-1 to 102-3. Then in step S27, the controller 104 increments the number of repeats by 1. Then in step S28, the controller 104 determines whether or not the number of repeats N reaches a predetermined maximum number of repeats Nmax; if Yes, then the flow proceeds to step S29; if No, then the flow proceeds to step S14 of FIG. 20.

When detecting a variation in the radio wave propagation environment (e.g., degradation in a communication quality) in step S14 of FIG. 20, step S13 is repeated. Accordingly, when detecting the variation in the radio wave propagation environment in step S14, the processes of steps S21 to S28 of FIG. 21 is repeated until the number of repeats N reaches the maximum number of repeats Nmax, thus determining an optimum combined directional pattern again, and recording the cumulative distribution of the numbers of measurements for each measurement value of the communication quality for the combined directional pattern of the candidate 1.

If Yes in step S28 of FIG. 21, then in step S29, the controller 104 sets the flag "flag" to "1", and initializes the number of repeats N to "0", and then, proceeds to step S14 of FIG. 20. In step S14, when detecting a variation in the radio wave propagation environment again, the controller 104 executes steps S21 to S23 of FIG. 21, and then in step S24, the controller 104 determines whether or not the flag "flag" is "0". In this case, since the flag "flag" is "1" as described above, the flow proceeds to step S30. Steps S30 to S33 are the same as steps S25 to S28 except that the combined directional pattern of the candidate 2 is used in place of the combined directional pattern of the candidate 1. The processes of steps S21 to S24, and S30 to S33 of FIG. 21 are repeated until the number of repeats N reaches the predetermined maximum number of repeats Nmax, thus determining an optimum combined directional pattern again, and recording the cumulative distribution of the numbers of measurements for each measurement value of the communication quality for the combined directional pattern of the candidate 2.

FIG. 22 is a table showing cumulative distribution of numbers of measurements for each measurement value of a communication quality measured by the processes of FIGS. 20 and 21. In the present embodiment, when recording the cumulative distribution of the numbers of measurements for each measurement value of the communication quality (in this case, a PHY rate is used) for each combined directional pattern, the numbers of measurements are recorded as some distinct cases each based on the output value of the function f calculated in step S23. In the present embodiment, the following three cases are used, but not limited thereto: a case where the output value of the function f is −60 to −50 (dB), a case where the output value is −70 to −60 (dB), and a case where the output value is −80 to −70 (dB). In addition, in the present embodiment, the PHY rates is one of 54 Mbps, 108 Mbps, 216 Mbps and 300 Mbps, but not limited thereto. When recording the measured communication quality, a number of measuring a certain PHY rate is accumulated under a given output value of the function f and a given combined directional pattern. According to the table of FIG. 22, for example, it can be seen that when the combined directional pattern Pa is set under the condition that the output value of the function f is −60 to −50 (dB), the PHY rate of 54 Mbps is measured three times.

Figure 24:
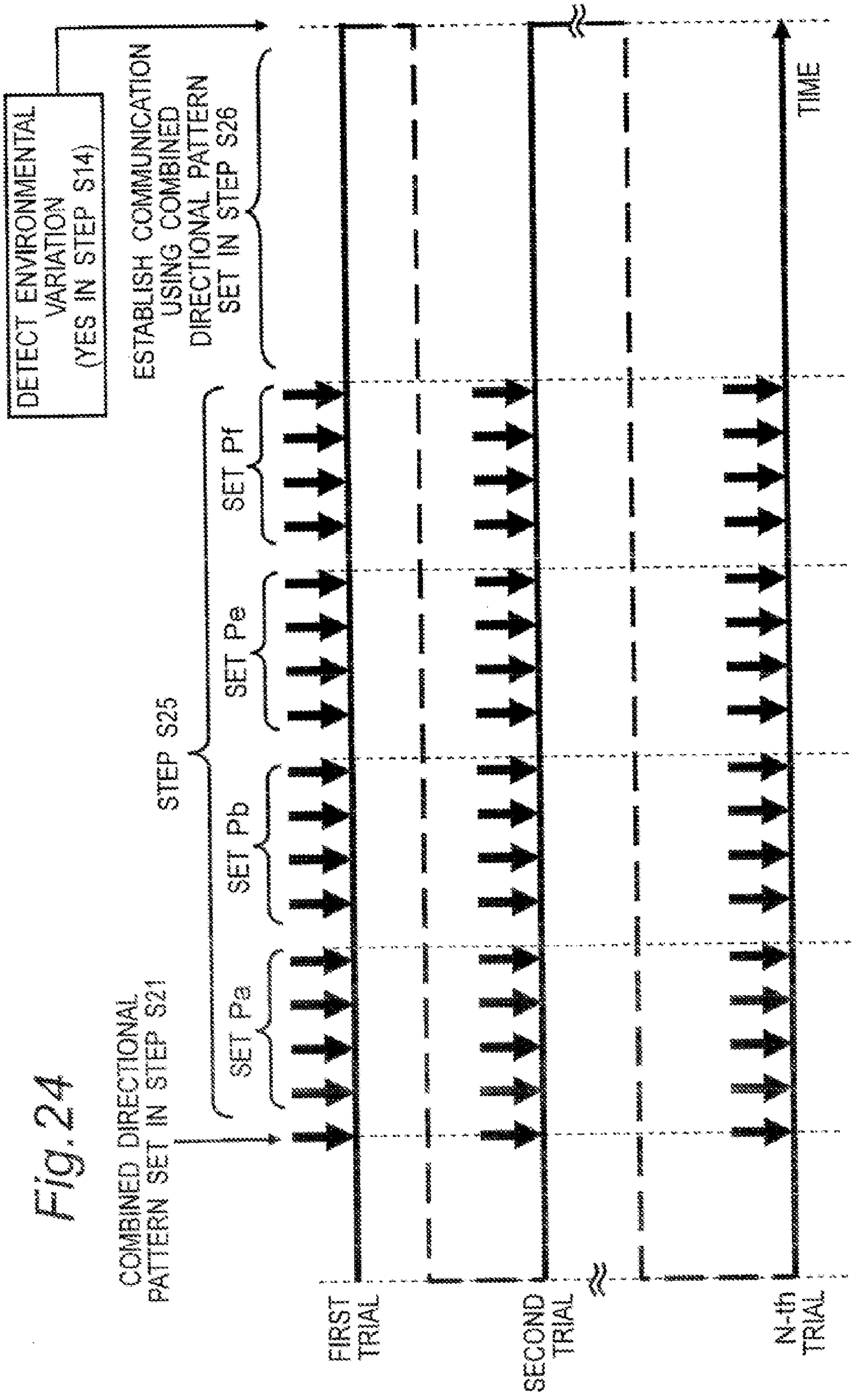
FIG. 24 is a diagram for illustrating combined directional patterns to be set, and a communication quality to be measured, when executing the processes of FIGS. 20 and 21.

FIG. 24 is a diagram for illustrating the combined directional patterns to be set, and the communication quality to be measured, when executing the processes of FIGS. 20 and 21 (particularly, when repeating steps S21 to S28 of FIG. 21). A number of trials of FIG. 24 corresponds to a number of executing the directional pattern memory updating process of step S13. Referring to FIG. 24, in a first trial, the controller 104 obtains the output value of the function f (step S23), with an initial combined directional pattern (e.g., Pa) being set in step S21. For example, the output value is −50 dB. Then in step S25, the controller 104 sets the combined directional pattern Pa of the candidate 1, for the steerable antenna elements 102-1 to 102-3, measures PHY rates for a predetermined number of packets at given intervals, and counts a relation between the PHY rate and the number of packets. In this case, for example, four packets are measured, and 54 Mbps is measured zero times, 108 Mbps is measured one time, 216 Mbps is measured three times, and 300 Mbps is measured zero times. In the table of FIG. 22, entries of the corresponding PHY rates of the combined directional pattern Pa in the case of −60 to −50 (dB) are incremented in accordance with the count values of these PHY rates. Likewise, PHY rates are measured for the other combined directional patterns Pb, Pc and Pf of the candidate 1, and in the table of FIG. 22, entries of the corresponding PHY rates of the combined directional patterns Pb, Pe and Pf in the case of −60 to −50 (dB) are incremented in accordance with the count values of these PHY rates. After step S25, the controller 104 continues the communication using the combined directional pattern set in step S26, and when detecting a variation in the radio wave propagation environment in step S14, the controller 104 executes a next trial (i.e., repeats step S13). Different output values of the function f with the combined directional pattern being set in step S21 may be obtained in the respective trials, and then, in accordance with the output value of the function f, the numbers of measurements for each PHY rate are accumulated in the table of FIG. 22 in one of the case of −60 to −50 (dB), the case of −70 to −60 (dB), and the case of −80 to −70 (dB). The table of FIG. 22 is obtained by repeating the accumulation of the numbers of measurements for each PHY rate by the maximum number of repeats Nmax, for the combined directional pattern of the candidate 1, and similarly, for the combined directional pattern of the candidate 2.

If the combined directional patterns have similar cumulative distributions of the numbers of measurements for each PHY rate in the table of FIG. 22 (i.e., similar contents in columns of the table), it means that these combined directional patterns are under the same environment and result in communication qualities with only small differences, and thus, it is judged that the communication qualities are strongly correlated. In the table of FIG. 22, the cumulative distribution of the combined directional pattern Pa is similar to that of the combined directional pattern Pe, the cumulative distribution of the combined directional pattern Pb is similar to that of the combined directional pattern Pc, the cumulative distribution of the combined directional pattern Pf is similar to that of the combined directional pattern Pg, and the cumulative distribution of the combined directional pattern Pd is similar to that of the combined directional pattern Ph. In this case, the maximum number of repeats Nmax is act so as to be able to acquire sufficient cumulative distributions to determine correlations among communication qualities for the respective combined directional patterns of the candidate 1 and the candidate 2.

When the number of repeats N for the combined directional pattern of the candidate 2 reaches the maximum number of repeats Nmax (Yes in step S33), then in step S34, the controller 104 sets the flag "flag" to "0" and initializes the number of repeats N to "0", and then, proceeds to step S35. In step S35, the controller 104 updates the combined directional pattern memory 104*m*, based on the cumulative distributions of the numbers of measurements for each measurement value of the recorded communication quality. FIG. 23 is a table showing contents of the combined directional pattern memory 104*m* updated by the processes of FIGS. 20 and 21. After updating the combined directional pattern memory 104*m*, the controller 104 continues the communication until a variation in the radio wave propagation environment is detected again. When detecting the variation, the controller 104 repeats step S13, and on the other hand, when the communication is completed, the controller 104 terminates the antenna controlling process.

As described above, according to the present embodiment, it is possible to improve the effect of changing the directional patterns by the wireless communication apparatus 100, by updating the combined directional pattern memory 104*m*. In addition, according to the present embodiment, four combined directional patterns of the candidate 1 or the candidate 2 are tested at one time, without testing all the combined directional pattern. Thus, it is possible to update the combined directional pattern memory 104*m* without sacrificing the speed for determining an optimum combined directional pattern.

Industrial Applicability

The directional pattern determining method according to the present invention can transmit data at high rate in a stable manner by quickly controlling antennas while tracking variations in a radio wave propagation environment, and is useful for equipment for transmitting real-time data, and the like.

Reference Signs List

100: wireless communication apparatus,
101: steerable array antenna device,
102-1 to 102-N: steerable antenna element,
103-1 to 103-N: steering controller circuit,
104: controller,
104*m*: combined directional pattern memory,
105-1 to 105-N: high-frequency processing circuit,
106: baseband processing circuit,
107: MAC processing circuit,
B1, B2, B3: directional pattern,
Pa to Ph, Px, Py, Pz: combined directional pattern,
Px', Py', Pz': combined directional pattern vector, and
R1, R2, R3: cross correlation function.

The invention claimed is:

1. A directional pattern determining method for a wireless communication apparatus provided with a plurality of steerable antenna devices, and a directional pattern memory for storing data on a plurality of combined directional patterns each including directional patterns to be set for the steerable antenna devices, said method comprising the steps of:

classifying the plurality of combined directional patterns into groups and storing the combined directional patterns in the directional pattern memory, such that among the plurality of combined directional patterns, the combined directional patterns strongly correlated with each other are classified into the same group, while the combined directional patterns weakly correlated with each other are classified into the different groups;

selecting one combined directional pattern from each group in the directional pattern memory;

determining one combined directional pattern from the selected combined directional patterns, in accordance with a first communication quality of signals each received when each one of the selected combined directional patterns is set for the steerable antenna element; and setting the determined combined directional pattern for the steerable antenna element.

2. The directional pattern determining method as claimed in claim 1, wherein the plurality of combined directional patterns are stored in the directional pattern memory, such that the plurality of combined directional patterns are ordered for each classified group based on a second communication quality, wherein the selecting step includes a step of selecting one combined directional pattern from each group in the directional pattern memory, in accordance with the second communication quality of a signal received when an initial combined directional pattern is set for the steerable antenna element.

3. The directional pattern determining method as claimed in claim 1, wherein the step of classifying the plurality of combined directional patterns into groups and storing the combined directional patterns in the directional pattern memory includes steps of; defining functions each representing a combined directional pattern with respect to an azimuth angle; and calculating a correlation of each pair of the combined directional patterns as a cross correlation function of the functions representing the pair of the combined directional patterns, respectively.

4. The directional pattern determining method as claimed in claim 3, wherein the calculating step includes steps of: for the each pair of the combined directional patterns, calculating a cross correlation function on an X-Y plane, a cross correlation function on a Y-Z plane and a cross correlation function on a Z-X plane, and obtaining a combined cross correlation function by combining the calculated cross correlation functions with each other using predetermined weights.

5. The directional pattern determining method as claimed in claim 3, wherein the calculating step includes steps of: for the each pair of the combined directional patterns, calculating a cross correlation function of a vertically polarized component and a cross correlation function of a horizontally polarized component; and obtaining a combined cross correlation function by combining the calculated cross correlation functions with each other using predetermined weights.

6. The directional pattern determining method as claimed in claim 3, wherein the calculating step includes steps of: for the each pair of the combined directional patterns, separately calculating cross correlation functions for the respective steerable antenna devices; and obtaining a combined cross correlation function by combining the calculated cross correlation functions with each other using predetermined weights.

7. The directional pattern determining method as claimed in claim 1, further including the steps of:

measuring a third communication quality of signals each received when one of the combined directional patterns is set for the steerable antenna element, and acquiring a cumulative distribution of numbers of measurements for each measurement value of a plurality of different measurement values of the third communication quality; and updating the groups of the combined directional patterns stored in the directional pattern memory, such that among the plurality of combined directional patterns, the combined directional patterns having cumulative distributions strongly correlated with each other are classified into the same group, while the combined directional patterns having cumulative distributions weakly correlated with each other are classified into the different groups.

* * * * *